United States Patent [19]

Richardson

[11] Patent Number: 4,646,806

[45] Date of Patent: Mar. 3, 1987

[54] BEADBREAKER APPARATUS AND METHOD OF USING

[75] Inventor: Robert O. Richardson, Bettendorf, Iowa

[73] Assignee: The United States of America as represented by the Secretary of the Army, Washington, D.C.

[21] Appl. No.: 273,702

[22] Filed: Jun. 15, 1981

[51] Int. Cl.⁴ .................................................. B60C 25/06
[52] U.S. Cl. ................................................. 157/1.17
[58] Field of Search ..................... 157/1.17, 1.26, 1.28

[56] References Cited

U.S. PATENT DOCUMENTS

| | | | |
|---|---|---|---|
| 2,575,330 | 11/1951 | Carlson | 157/1.17 |
| 2,907,381 | 10/1959 | Newton et al. | 157/1.26 |
| 3,300,184 | 1/1967 | Ragolio | 157/1.17 X |
| 3,332,467 | 7/1967 | Clark | 157/1.17 |
| 3,706,335 | 12/1972 | Long | 157/1.17 |
| 3,942,575 | 3/1976 | Blomgren et al. | 157/1.26 |

FOREIGN PATENT DOCUMENTS 2039654 2/1972 Fed. Rep. of Germany ..... 157/1.17

Primary Examiner—Frederick R. Schmidt
Assistant Examiner—Debra S. Meislin
Attorney, Agent, or Firm—Anthony T. Lane; Robert P. Gibson; Harold H. Card, Jr.

[57] ABSTRACT

A method and apparatus for breaking the bead of a tire from the tire rim edge wherein commonly and readily available tools are used, such as tire irons, tire jack and a log chain. The log chain wrapped around the tire and rim forms a sling. The jack base rests on the tire sidewall with the jack extensible portion engageable with the chain sling whereby expansion of the jack depresses the tire bead from the rim edge.

1 Claim, 7 Drawing Figures

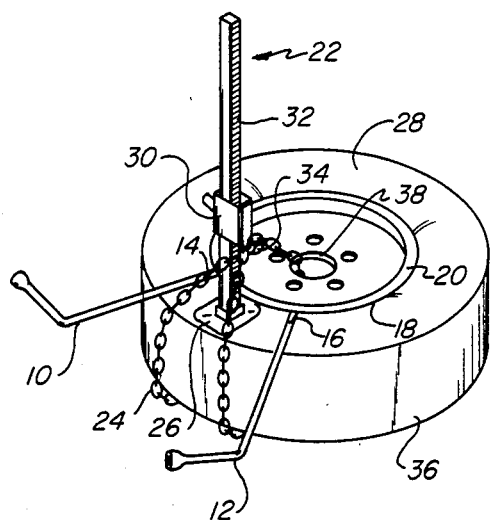
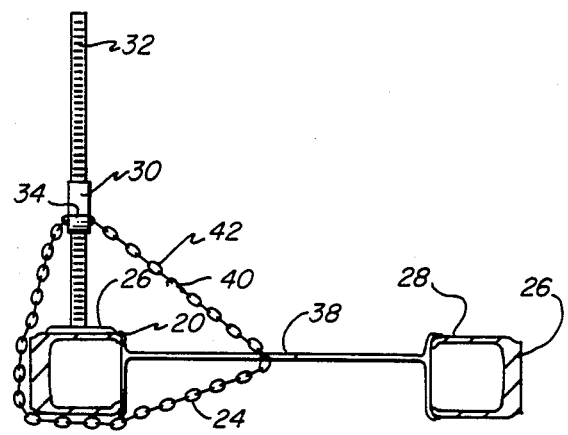
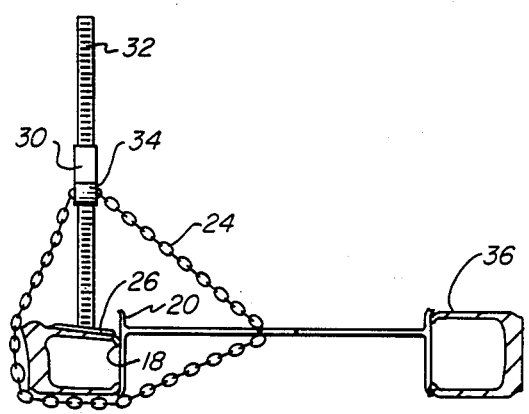

BEADBREAKER APPARATUS AND METHOD OF USING

GOVERNMENT RIGHTS

The invention described herein may be manufactured and/or used by or for the Government for governmental purposes without the payment of any royalty thereon.

BACKGROUND OF THE INVENTION

A worn or damaged vehicle tire must be removed from the rim to be repaired or replaced. After removing the air from the tire, the tire bead must then be broken from the rim before it can be pried over the rim in removing it. Beadbreakers in gas stations and garages are heavy, expensive and require pneumatic or hydraulic power to operate.

A small portable beadbreaker such as shown in U.S. Pat. No. 3,847,197 requires a source of hydraulic power to clamp jaws onto the wheel rim and a piston actuated foot to bear against the tire bead to remove it from contact with the rim. Another beadbreaker uses opposed discs bearing down on the tire bead as it is rotated to break the bead. This requires a base and means to apply downward force on the discs. Both beadbreakers are auxiliary equipment needed for the sole purpose of breaking the bead.

U.S. Pat. No. 3,706,335 shows a tire removal device consisting of a jack with tire removing lip adjacent the rim on which the tire is mounted. A tube member extends over the jack shaft above the ratchet and bears against a building rafter. By expanding the ratchet, downward pressure forces the lip down and disengages the tire from the rim. U.S. Pat. No. 4,079,769 uses a frame and a pair of opposed jacks to depress the side of a tire from its rim to enable easy insertion of the lock ring about the tire rim.

SUMMARY OF PRESENT INVENTION

The present invention utilizes existing equipment of a jack, log chain, several tire irons and a hammer, items usually found in a truck.

In practice a log chain is passed through the center of the tire rim and around the tire to form a continuous sling. Two loops is suggested before engaging the chain hook over a chain link to close the loop. A tire jack is then positioned on the tire sidewall adjacent the rim with the chain loops passing over the jack top. As the jack is actuated, its base depresses the tire sidewall, breaking the bead from the tire rim. A small adapter may be necessary to keep the chain on the top of the jack for actuation.

If the tire is stubborn and the bead does not break after the above operation, tire irons may be hammered between the bead and rim on either side of the tire jack base. If this does not break the bead, the jack may then be collapsed and the base moved onto one of the tire irons. Once again the jack should be extended between the chains at the top of the jack and the jack base on the tire rim. This urges not only the tire sidewalls to depress, but the bead on the tire as well.

It has been suggested that this beadbreaker action might deform the tire from the other side since the chain provides less contact area than the jack base on the sidewall of the tire. Should this happen, simply insert a board against the sidewall before wrapping the chain around the tire.

It has been further suggested that as the jack is actuated, the chain will slip off the jack top. This can be overcome with a small flat plate between the chain and jack top. Another solution is to insert a cap or sleeve over the jack top with a rod or cradle protruding up through the chain links.

In extremely stubborn cases, Coca-Cola poured between the bead and the rim will "unstick" the bead. However, it should be washed off after the tire is removed.

In still another method the jack base may be positioned adjacent the rim and the jack ratchet engageable with a truck axle or bumper positioned over the tire. By extending the jack, the jack base depresses the tire from its rim.

BRIEF DESCRIPTION OF DRAWINGS

FIG. 1 is a perspective view showing beadbreaking apparatus in use,

FIG. 2 is a sectional view in elevation showing the apparatus in position,

FIG. 3 is a sectional view similar to that in FIG. 2, but with the apparatus actuated and the tire bead separated from the tire rim.

DETAILED DESCRIPTION OF PREFERRED EMBODIMENTS

Figure 4:
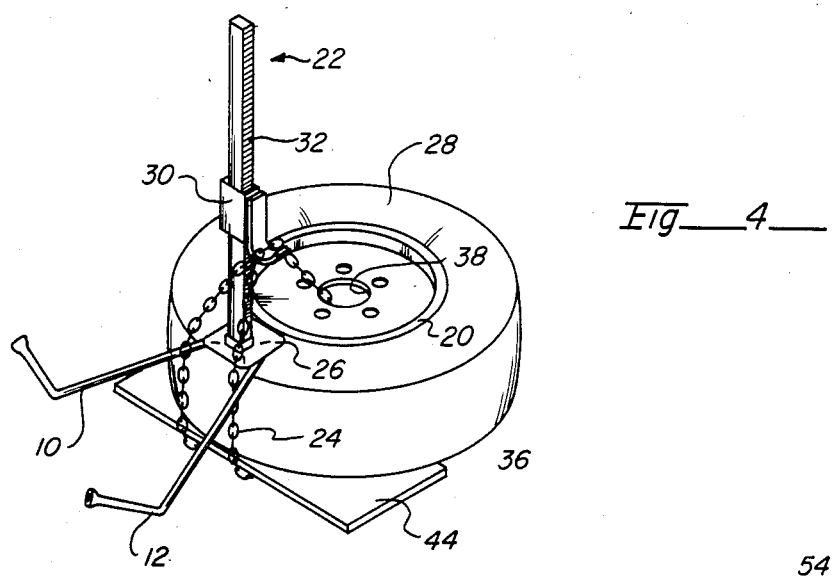
FIG. 4 is a perspective view similar to FIG. 1, but with the jack base positioned on tire irons and a board under the tire with chains therearound.

In accordance with the present invention, air is removed from a rim mounted tire before the tire is removed from the rim. Thereafter, the tire bead is depressed from the edge of the rim to facilitate its ultimate removal.

In a simple procedure when the tire is easy to remove, a pair of tire irons 10, 12 are positioned, as shown in FIG. 1, with their edges 14, 16, between the tire bead 18 and rim edge 20. (In this case the jack 22 and chain 24 is not used.) The tire irons 10, 12 are then rotated upwardly and inwardly to pry out the tire bead 18 from its rim edge 20. As the tire irons are worked around the rim, the tire bead comes free of the rim and the tire can then be removed.

The method just described is conventional and usually works satisfactorily on passenger automobile tires. Truck, tractor, and military vehicle tires, however, are often more difficult to remove. In such cases the bumper jack 22 and log chain 24 are used to exert additional downward pressure on the tire sidewall adjacent the rim edge 20.

In FIG. 1 there is shown the jack base 26 adjacent rim edge 20 and resting on tire sidewall 28. The ratchet 30 is on rack 32 of the jack 22 in such manner that its actuation causes it to move upwardly. The ratchet 30 has a lip 34 which normally engages a vehicle bumper to lift it up for wheel exchanging purposes. As shown, a log chain 24 is passed around the tire 36, through the center opening 38, and over jack lip 34. Preferably two loops are made to provide jack stability, before the chain hook engages a chain link to complete the assembly.

The jack and chain arrangement of FIG. 1 is more clearly shown in the vertical sectional view of FIG. 2. Here it can be seen that jack base 26 is positioned on tire sidewall 28 adjacent rim edge 20. Chain 24 passes around tire 36, through rim center opening 38 and over lip 34 of jack ratchet 30. A hook 40 at the end of the chain 24 engages a chain link 42. As the jack is operated, ratchet 30 moves upwardly causing lip 34 to bear against the chain 24. Further actuation of the jack causes rack 32 to move downwardly, depressing the jack base 26 against the side of the tire, such as shown in FIG. 3.

In FIG. 3 the tire bead 18 is broken away from the rim edge 20, which is the mission accomplished by the present invention. Thereafter the ratchet 30 of the jack is lowered to develop slack in the chain 24 so it may be removed. The tire can then be removed from its rim by using tire irons in a conventional and well-known manner.

In FIG. 4 there is shown a slight modification to the procedure just described. It may be used when the tire bead is not readily broken away from the rim during the first procedure. In this variation the tire irons 10, 12 are placed close enough together that the jack base 26 rests on them and a board 44 is positioned between the chains 24 and the underside of the tire. This permits the tire jack generated pressure to bear against the smaller area of the tire irons 10, 12 instead of against the larger area jack base 26. This greater pressure per unit area on the tire will cause tire bead separation from the rim in the more stubborn situations. The board 44 between the under side of the tire and the chains prevents tire depression from the underside.

Figure 5:
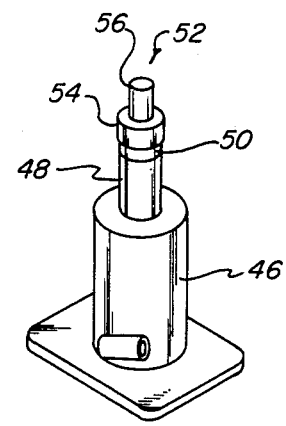
FIG. 5 is a perspective view of a hydraulic jack with a lug on the piston to engage a chain link to keep the chain from slipping.

FIG. 5 shows a hydraulic jack 46 that may be used instead of the rack and ratchet type jack 22 used in FIGS. 1–4. Upon actuation, the jack piston 48 moves upwardly. Since the piston 48 has a small round flat head 50, the chain 24 will slip off rather easily. To avoid this, a cap 52 is provided. This cap comprises an enlarged cylindrical portion 54 which fits over the piston head 50 with a lug 56 projecting upwardly.

When the hydraulic jack is used, as before, one of the chain links may be passed over the lug to keep the chain from falling off.

Figure 6:
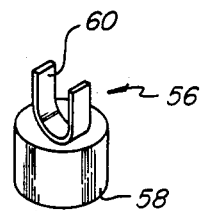
FIG. 6 is a perspective view of an alternate form of hydraulic piston top attachment.

FIG. 6 shows an alternate form of cap 56 that may be used. This consists of an enlarged cylindrical portion 58 with a U-shaped cradle 60 at the top. This cradle receives and keeps the chain on the jack top and keeps it from slipping.

Figure 7:
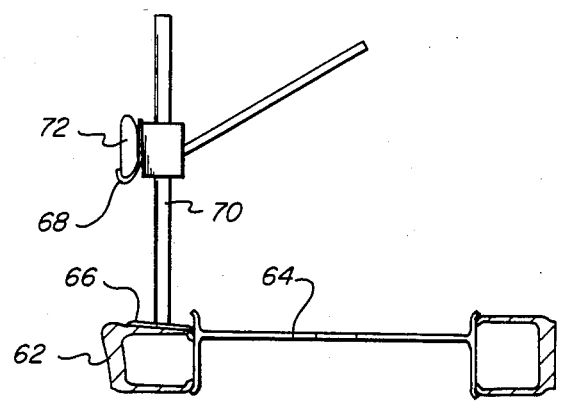
FIG. 7 is a sectional view in elevation showing an alternate form of apparatus.

FIG. 7 shows an alternate form of equipment used in breaking the bead of a tire away from its rim. FIG. 7 is similar to FIG. 2 in that the tire 62 and rim 64 are placed horizontally with the jack base 66 on the top of the tire adjacent the rim. The ratchet lip 68 of the jack 70 bears up against a truck bumper 72 as a means of obtaining downward pressure on the tire bead. If the jack is of the hydraulic type, the jack piston may bear against the truck axle. The weight of a truck may thus be used to bear against the tire wall to break it away from the tire rim.

The invention in its broader aspects is not limited to the specific combinations, improvements and instrumentalities described but departures may be made therefrom within the scope of the accompanying claims without departing from the principles of the invention and without sacrificing its chief advantages.

I claim:

1. Apparatus for breaking a tire bead away from a tire rim on which it is mounted comprising:
   a. a length of log chain loosely wrapped around the tire, through the center of the rim and back to form a continuous sling,
   b. a hydraulic jack having a base on the sidewall of the tire adjacent the tire rim,
   c. said jack having a piston head with a cap thereon, supporting the loop of said chain at the top thereof,
   d. an upwardly extending lug on said cap having chain links inserted thereover to limit the length of said loop and to prevent slippage of said chain therefrom,
   e. a board positioned between said chains and the underside tire sidewall,
   f. a pair of tire irons on the upper tire sidewall with the ends thereof inserted between the tire rim edge and the tire bead, said jack base being positioned on said tire irons,
   g. said jack upon extension placing pressure on the tire sidewall to remove it from its associated tire rim edge.

* * * * *